(12) United States Patent
Stanger

(10) Patent No.: US 8,076,616 B2
(45) Date of Patent: Dec. 13, 2011

(54) COOK AND HOLD SYSTEM AND METHOD WITH RIBBED TRAY

(75) Inventor: Keith A. Stanger, Trinity, FL (US)

(73) Assignee: Merco/Savory, LLC, Fort Wayne, IN (US)

( * ) Notice: Subject to any disclaimer, the term of this patent is extended or adjusted under 35 U.S.C. 154(b) by 1007 days.

(21) Appl. No.: 11/897,122

(22) Filed: Aug. 29, 2007

(65) Prior Publication Data

US 2008/0053983 A1 Mar. 6, 2008

Related U.S. Application Data

(60) Provisional application No. 60/840,884, filed on Aug. 29, 2006.

(51) Int. Cl.
*H05B 6/64* (2006.01)
*A21B 1/26* (2006.01)
*A21B 1/50* (2006.01)
*A21B 2/00* (2006.01)
*A21B 3/15* (2006.01)

(52) U.S. Cl. ........ 219/400; 219/386; 219/394; 219/681; 99/483

(58) Field of Classification Search .................... None
See application file for complete search history.

(56) References Cited

U.S. PATENT DOCUMENTS

| | | | |
|---|---|---|---|
| 2,897,746 A | 8/1959 | Hilgers | 99/443 R |
| 3,659,585 A | 5/1972 | Bay | 126/390.1 |
| 3,884,213 A * | 5/1975 | Smith | 126/21 A |
| 4,409,453 A * | 10/1983 | Smith | 219/684 |
| 4,676,151 A * | 6/1987 | Gorsuch et al. | 99/450 |
| 4,870,233 A | 9/1989 | McDonald et al. | 219/730 |
| 5,211,105 A * | 5/1993 | Liu | 99/446 |
| 5,365,039 A | 11/1994 | Chaudoir | 219/401 |
| 5,404,935 A * | 4/1995 | Liebermann | 165/48.1 |
| 6,315,039 B1 * | 11/2001 | Westbrooks et al. | 165/201 |
| 6,323,464 B1 * | 11/2001 | Cohn | 219/401 |
| 6,684,657 B1 * | 2/2004 | Dougherty | 62/237 |
| 7,196,291 B2 * | 3/2007 | Cothran | 219/394 |
| 7,328,654 B2 * | 2/2008 | Shei | 99/468 |
| 2004/0069155 A1 | 4/2004 | Shei | 99/448 |
| 2005/0204931 A1 * | 9/2005 | Cheng | 99/422 |
| 2006/0185527 A1 * | 8/2006 | Shei | 99/467 |

OTHER PUBLICATIONS

International Search Report and Written Opinion dated Feb. 13, 2008 based on PCT application No. PCT/US07/19002.

* cited by examiner

*Primary Examiner* — Joseph M Pelham
(74) *Attorney, Agent, or Firm* — Ohlandt, Greeley, Ruggiero & Perle, L.L.P.

(57) ABSTRACT

A cook and hold system having an oven, a food warmer and a metallic food tray. The metallic food tray is used in the oven to hold the food products during cooking and then is rapidly transferred to the food warmer for holding. The food warmer has doors that cover the food warmer inlets so as to retain moisture and heat so that the food products are moist and warm when removed from the food warmer. The food tray has a bottom with parallel ribs that provide grill markings on the food products and a trapping of cook byproducts, such as moisture, grease and particles in the bottom spaces along side the ribs. These byproducts help to preserve heat and moisture when the food tray is transferred from the quick cook oven to the food warmer.

11 Claims, 4 Drawing Sheets

COOK AND HOLD SYSTEM AND METHOD WITH RIBBED TRAY

RELATED APPLICATION

This application claims the priority benefit of U.S. Provisional Patent Application Ser. No. 60/840,884, filed on Aug. 29, 2006, the entire contents of which are hereby incorporated by reference.

BACKGROUND

1. Field of the Disclosure

The present disclosure relates to a method and system for cooking and holding food products.

2. Background of the Disclosure

In the fast food industry, quick cook ovens are used to quickly cook food items in rapid cooking times as compared to conventional non-quick cook ovens. There are high demand times when the quick cook oven cannot be operated fast enough to meet the demand. To satisfy the high demand, a cook and hold system is used in which food product is cooked during low demand time and held in a holding cabinet for serving during the high demand time. Food items held in current cook and hold systems become dry (i.e., lose moisture and cold (i.e., lose heat).

Thus, there is a need for a cook and hold system and method that provides moist and warm food.

SUMMARY

A cook and hold system of the present invention comprises a quick cook oven that cooks food products carried by a food tray that comprises a bottom with a plurality of parallel ribs. A food warmer holds the food tray carrying the food products after being cooked. The food warmer comprises at least one opening for insertion and removal of the food trays, the opening being covered by a door to retain moisture and heat of the food products.

A cook and hold system comprising: an oven that cooks food products carried by a food tray that comprises a bottom with a plurality of parallel ribs; and a food warmer that holds said food tray carrying said food products and that comprises at least one opening for insertion and removal of said food trays, and wherein said opening is covered by a door to retain moisture and heat of said food products.

Preferably, the cooking byproducts collect in spaces of said bottom adjacent said ribs, and wherein moisture and heat of said cooking byproducts are also retained within said food warmer by said door. A plurality of holes are disposed about the apex of said ribs. The tray is metallic, and wherein said oven cooks said food products at least in part with microwave energy and/or impingement air.

The food warmer comprises a plurality of levels for holding a plurality of food trays, wherein each of said levels holds at least two of said food trays.

A method for cooking and holding food products comprising: placing said food products on a food tray that comprises a bottom with a plurality of parallel ribs; inserting said food tray and food products into an oven that cooks said food products; transferring said food tray with cooked food products to a food warmer; and preventing transfer to ambient of heat and moisture from said food products while in said food warmer.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
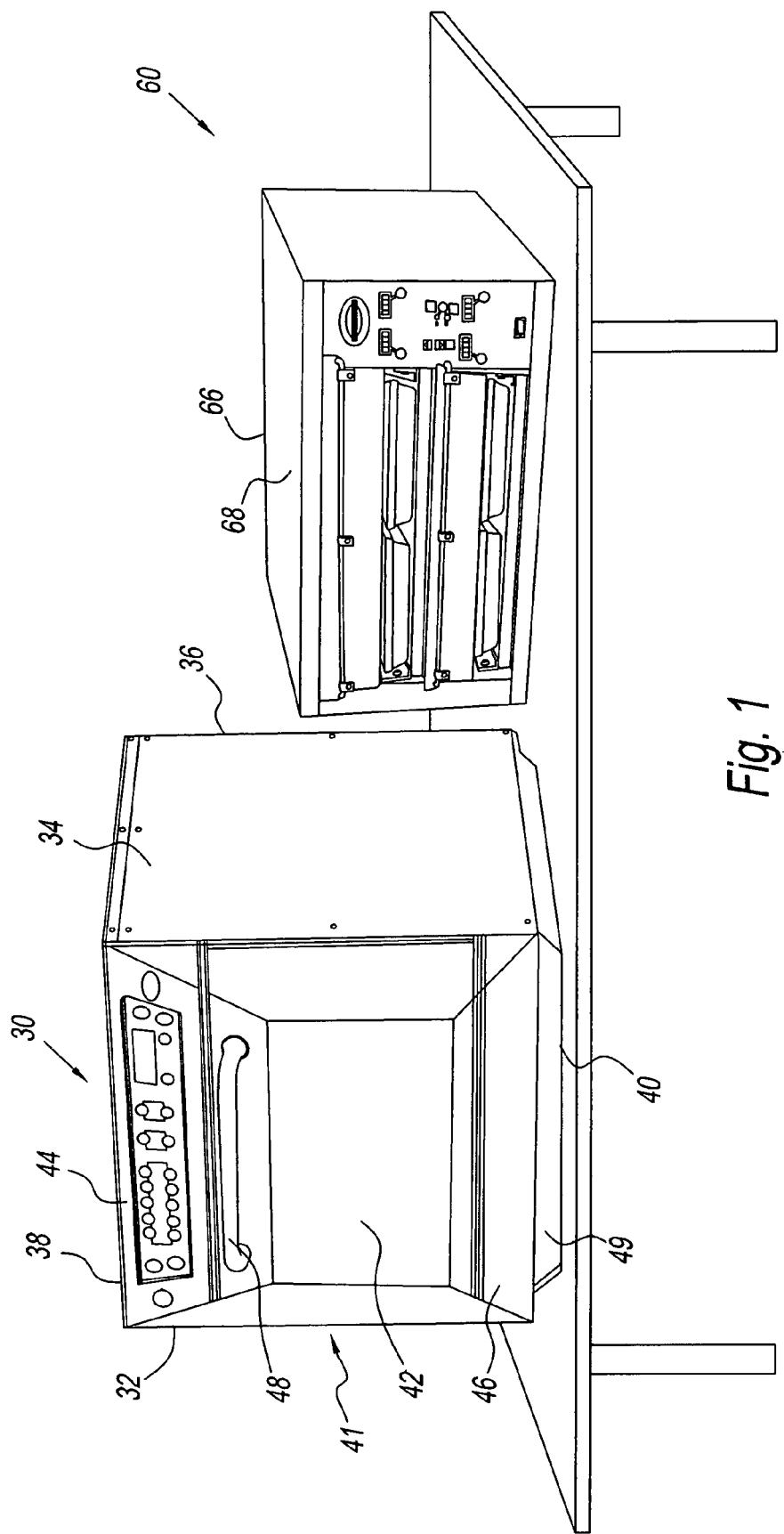
FIG. 1 is a perspective view of the cook and hold system of the present invention.

Referring to FIG. 1, the cook and hold system of the present invention comprises a quick cook oven 30 and a food warmer 60. Quick cook oven 30, e.g., may be a combination convection, impingement and microwave quick cook oven. That is, quick cook oven 30 is configurable to operate in convection, impingement and microwave modes. Quick cook oven 30 comprises a pair of outer side walls 32 and 34, an outer back wall 36, an outer top wall 38, an outer bottom wall 40 and a front wall 41, all of which comprise an outer enclosure. Front wall 41 comprises a door 42, a control panel 44 above door 42 and a grease drawer 46 below door 42. A handle 48 is disposed on door 42 for opening the door in a pull down manner. Outer bottom wall 40 is offset from outer side walls 32 and 34, outer back wall 36 and front wall 41. The offset is preferably a bevel 49, but could have other shapes.

Figure 4:
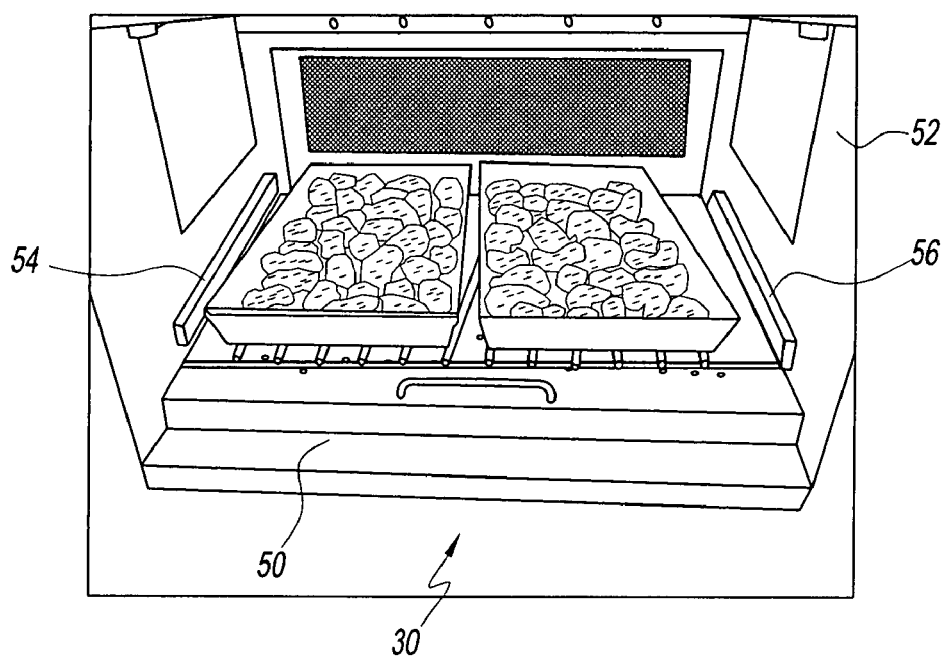
FIG. 4 is perspective view of the oven with door open of the system of FIG. 1.
Figure 5:
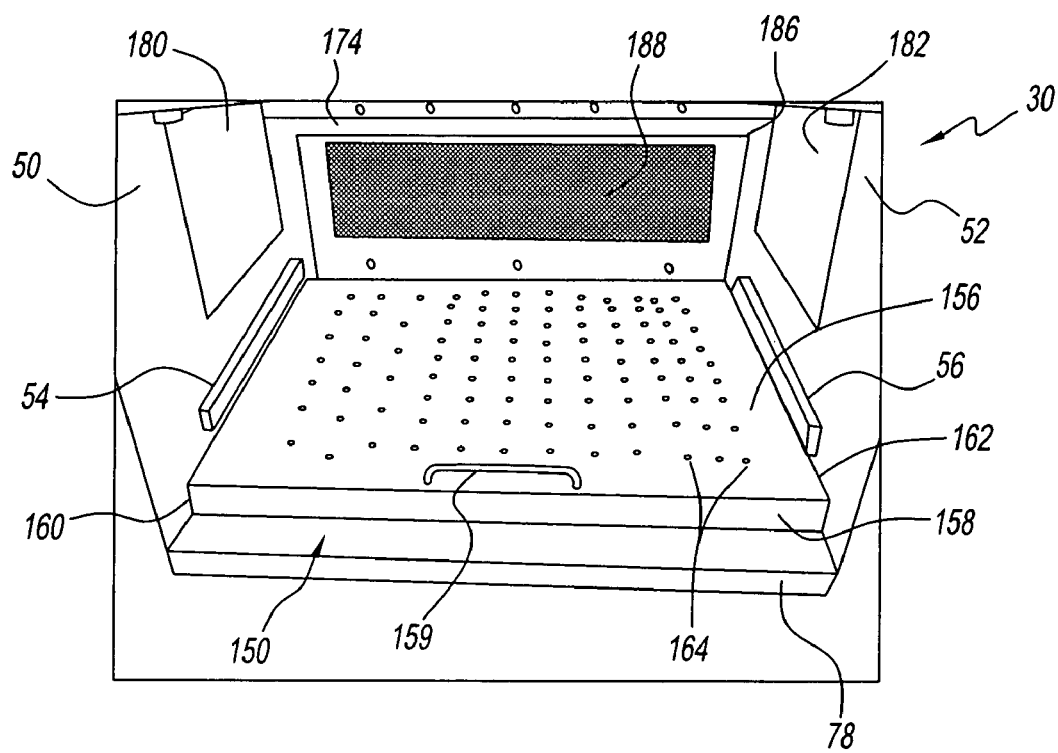
FIG. 5 is another perspective view of the oven with door open of the system of FIG. 1.

Referring also to FIGS. 4 and 5, quick cook oven 30 further comprises inner side walls 50 and 52 upon which are mounted rack supports 54 and 56, respectively. A standard food rack 58, i.e., available off-shelf, is disposed on rack supports 54 and 56. A pair of food trays 100 is disposed on standard food rack 58. Though not shown in FIGS. 4 and 5, one or more additional levels of rack supports and food racks could be placed above rack supports 54 and 56 and food rack 58 to accommodate additional food trays.

Quick cook oven 30 further comprises a baffle plate 174 disposed vertically as a divider forming a cook chamber where food trays 100 are shown and a fan box (not shown) behind baffle plate 174. Baffle plate 174 comprises an opening 186 that covered by a grease filter 186 and that is at least partially in registration with a fan (not shown) in the fan box.

Quick cook oven 30 is configurable in either a convection mode or an impingement mode by installing removable impingement plates. To provide impingement from below, a lower impingement plate 150 is disposed on an inner bottom 78 of quick cook oven 30. Lower impingement plate 150 comprises a top side 156, a front side 158, a left side 160 and a right side 162. Top side 156 comprises an array of jet holes 164 shaped to provide jets or columns of impingement air. Plate 150 is dimensioned for installation by sliding motion along an inner bottom wall 78 of quick cook oven 30. To facilitate installation and removal, a handle 158 is disposed on top side 156. Impingement plate 150 also comprises one or more guides or locators (not shown) to assure that it is installed flush with baffle plate 174 to minimize air leakage and in registration with one or more apertures (not shown) in baffle plate 174 below opening 186.

When installed, impingement plate 150 forms with inner bottom wall 78 an impingement plenum that is in fluid communication with the fan box via the apertures below opening 186 in baffle plate 174. Thus, airflow circulated by the fan in fan box 72 pressurizes lower impingement plate 150 to provide jets or columns of impingement air toward quick cook oven rack 58 (FIG. 4).

In other embodiments, quick cook oven 30 can be provided with impingement air from above. For configuration in a convection mode, lower impingement plate 150 is removed and convection air is circulated via opening 186 and the apertures below opening 186 and/or other apertures (not shown) suitably placed on baffle plate 174.

In other embodiments, quick cook oven 30 may be configurable in a microwave mode, a combination microwave/convection mode, a combination microwave/impingement mode, or a convection/microwave/impingement mode.

Figure 2:
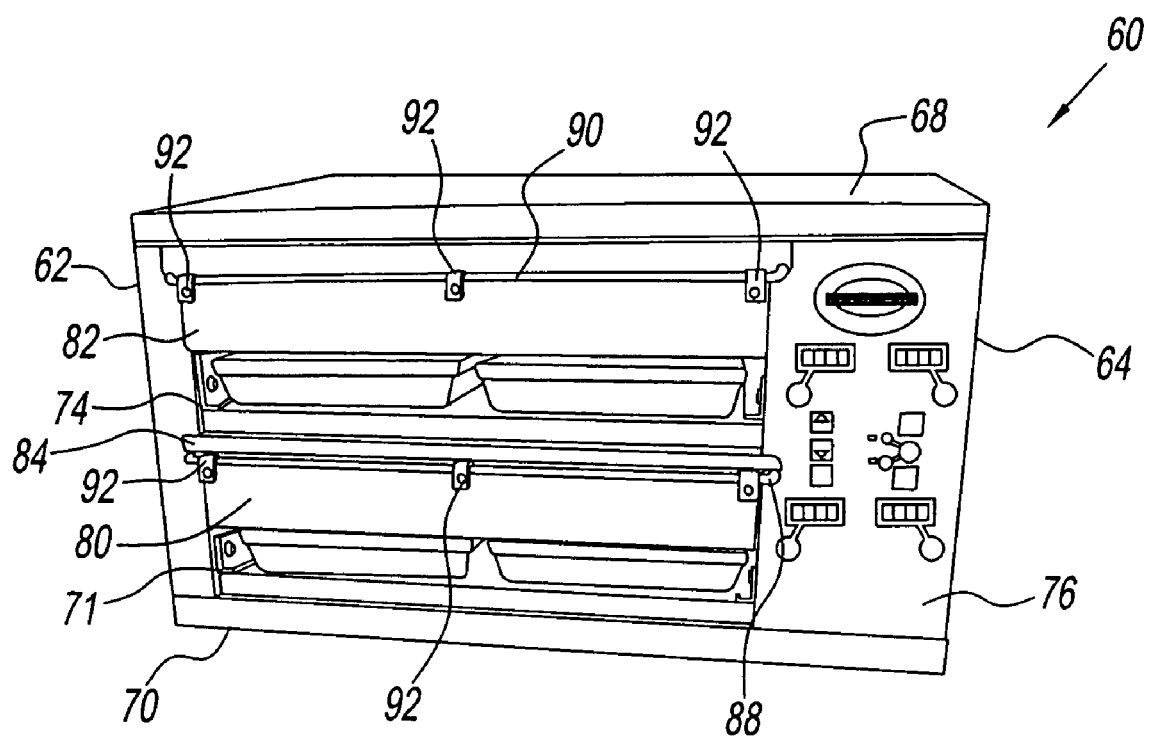
FIG. 2 is a perspective view of the food warmer of the system of FIG. 1.

Referring still to FIG. 1 and also to FIG. 2, food warmer 60 comprises a pair of outer side walls 62 and 64, an outer back wall 66 (FIG. 1), an outer top wall 68 (FIG. 1), an outer bottom wall 70 and a front wall 71, all of which comprise an outer enclosure. Front wall 71 comprises a pair of openings 72 and 74 and a control panel 76.

Food warmer 60 is shown with upper and lower holding racks. Clear swing doors 80 and 82 (shown in an open position in FIG. 2 and in a closed position in FIG. 1) are disposed to cover openings 72 and 74, respectively. Block-off plates 84 and 86 above swing doors 80 and 82 serve to prevent loss of heat. Swing doors 80 and 82 in combination with trays 100 help to maintain an ideal food holding environment of moisture and heat within food warmer 60. That is moisture from the food products in food warmer 60 is prevented from escaping and is held in food warmer 60 by swing doors 80 and 82. In food warmer 60, the food product is heated by long wave infrared (IR) from above and conduction from the tray below. A pair of support rods 88 and 90 is mounted to front wall 71. Swing doors 80 and 82 are mounted to support rods 88 and 90 by hinges 92 for rotation between the open position shown in FIG. 2 for insertion and removal of trays 100 and a closed position that covers openings 72 and 74 as shown in FIG. 1.

Trays 100 are preferably metallic trays. Preferably trays 100 are aluminum. Quick cook oven 30 is capable of using metallic trays in convection and microwave modes. The metallic trays 100 are used as cooking pans for cooking food products in quick cook oven 30. When the food products are cooked, trays 100 are removed and inserted into food warmer 60. Metallic trays 100 are shown through open swing doors 80 and 82 of food warmer 60 in FIG. 2. The use of metallic trays 100 allows the rapid transfer of trays 100 with cooked food product from quick cook oven 30 to food warmer 60 without substantial heat loss.

Figure 3:
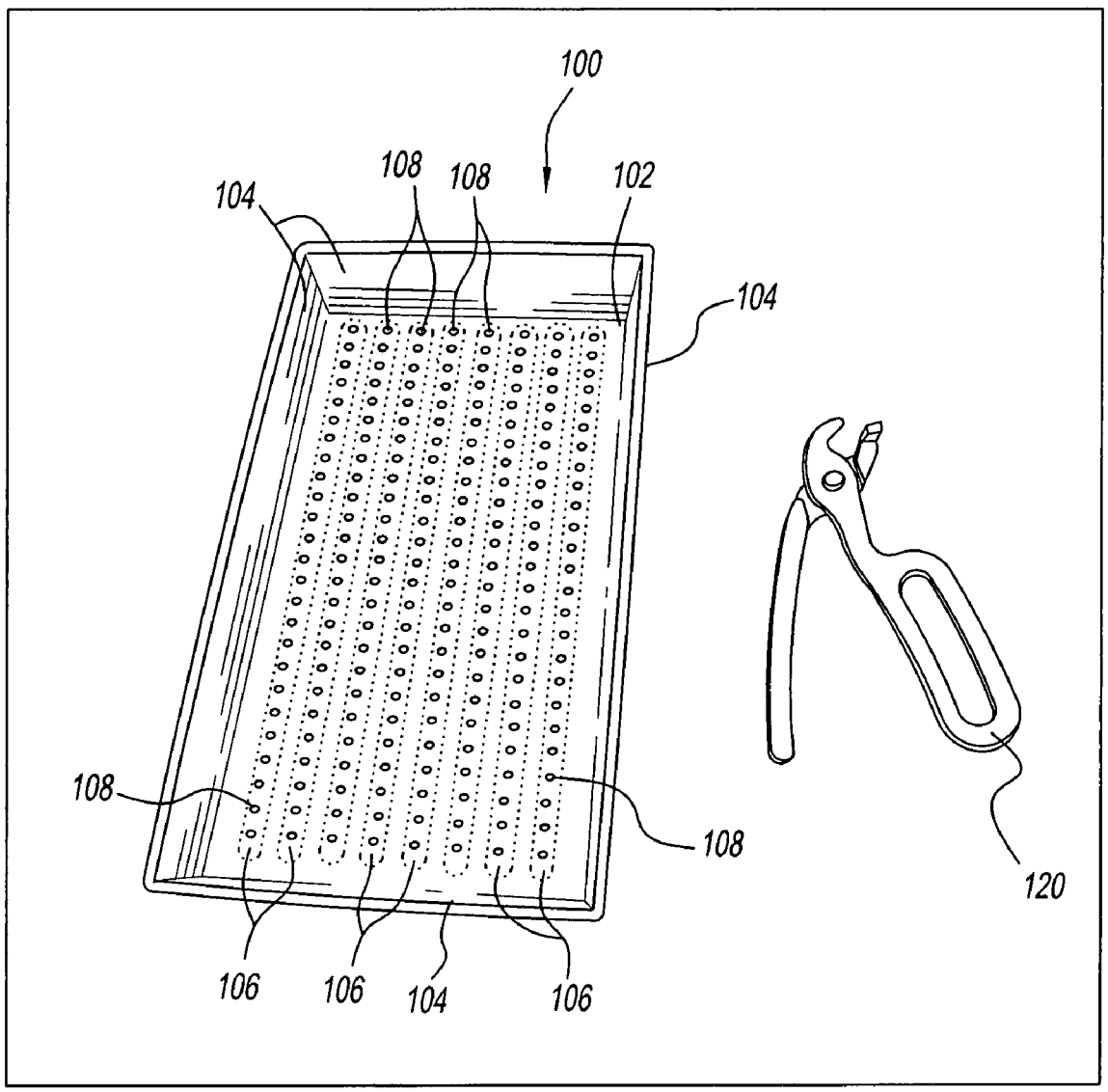
FIG. 3 is a perspective view of the food tray of the system of FIG. 1.

Referring to FIGS. 3 and 4, metallic tray 100 comprises a bottom 102 and a plurality of side walls 104. Bottom 102 comprises a plurality of parallel embossed ribs 106 extending upwardly. Ribs 106 comprise a plurality of holes 108 that allow airflow from below during cooking in the quick cook oven, thereby providing enhanced heat transfer. That is, the heated convection airflow contacts the food product directly via holes 108, which is important for upwardly flowing impingement air. Preferably, holes 108 are disposed on the peaks or tops of ribs 106 so as to allow for most of the cooking byproducts (e.g., moisture, particles and grease to collect in bottom 102. This is preferred to allow the cooking byproducts to provide additional heat and moisture during the time tray 100 is resident in food warmer 60. Tray 100 may be provided with a release coating (e.g., Teflon®—polytetrafluoroethylene (PTFE) is a synthetic fluoropolymer) to minimize food sticking during cooking. Ribs 106 provide grill markings for grilled food and prevent a stewing of food products in the grease. In some embodiments, holes 108 may be omitted.

Also shown in FIG. 3 is a tray tool 120 that is useful for inserting and extracting trays 100 into and from quick cook oven 30 and food warmer 60.

Although food warmer 60 is shown with two levels of food trays, other embodiments may include only one level or more than two levels. Further embodiments may include a plurality of food warmer levels in a stacked or other relationship.

The present invention having been thus described with particular reference to the preferred forms thereof, it will be obvious that various changes and modifications may be made therein without departing from the spirit and scope of the present invention as defined in the appended claims.

What is claimed is:

1. A cook and hold system for cooking and holding food products, comprising:
    an oven comprising a bottom and a plurality of walls that form a cook chamber, an impingement plate that is disposed above said bottom and that comprises an array of jet holes shaped to provide columns of impingement airflow;
    one or more food trays that carry said food products and that are disposed in said cook chamber above said impingement plate, each of said food trays comprising a bottom with a plurality of parallel ribs in which a plurality of rib holes is disposed, wherein said impingement airflow directly contacts said food products via said rib holes during cooking in said cook chamber; and
    a food warmer that holds said one or more food trays carrying said food products and that comprises at least one opening for insertion and removal of said food trays, and wherein said opening is covered by a door to retain moisture and heat of said food products.

2. The cook and hold system of claim 1, wherein cooking byproducts collect in spaces of said bottom adjacent said ribs, and wherein moisture and heat of said cooking byproducts are also retained within said food warmer by said door.

3. The cook and hold system of claim 1, wherein said plurality of rib holes is disposed about said apex of said ribs.

4. The cook and hold system of claim 1, wherein said tray is metallic, and wherein said oven cooks said food products at least in part with microwave energy and/or said impingement airflow.

5. The cook and hold system of claim 1, wherein said food warmer comprises a plurality of levels for holding said one or more food trays.

6. The cook and hold system of claim 5, wherein each of said levels holds at least two of said food trays.

7. A method for cooking and holding food products comprising:
    placing in an oven a food tray upon which said food products are disposed, wherein said food tray comprises a bottom with a plurality of parallel ribs, wherein each of said ribs has an apex in which a plurality of holes is disposed;
    cooking said food products in said oven with upwardly flowing impingement air that directly contacts said food products via said holes;
    transferring said food tray with cooked food products to a food warmer via at least one opening of said food warmer; and
    covering said opening to minimize escape to ambient of heat and moisture from said food products while in said food warmer.

8. The method of claim 7, wherein cooking byproducts collect in spaces of said bottom adjacent said ribs, and wherein transfer of moisture and heat of said cooking byproducts to ambient is also prevented.

9. The method of claim 7, wherein said tray is metallic, and wherein said oven cooks said food products at least in part with microwave energy or impingement air or both microwave energy and impingement air.

10. The method of claim 7, wherein said food warmer comprises a plurality of levels for holding a plurality of food trays.

11. The method system of claim 10, wherein each of said levels holds at least two of said food trays.

* * * * *